United States Patent Office 3,299,582
Patented Jan. 24, 1967

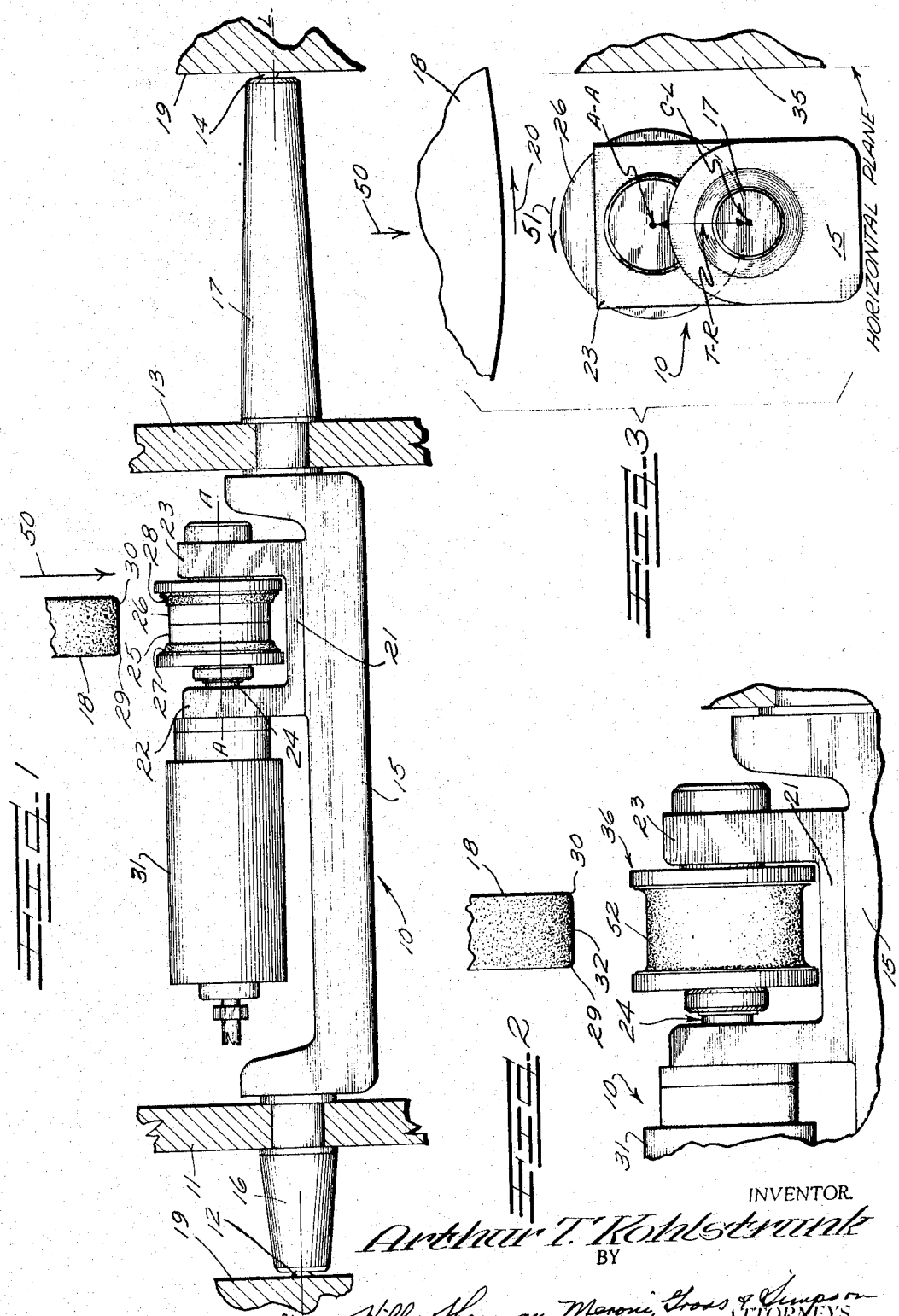

3,299,582
CRANKSHAFT-SIMULATING DRESSER
Arthur T. Kohlstrunk, Detroit, Mich., assignor to Wheel Trueing Tool Company, Detroit, Mich., a corporation of Delaware
Filed Feb. 27, 1964, Ser. No. 347,831
7 Claims. (Cl. 51—262)

This invention relates to a crankshaft-simulating dresser and more particularly to such a dressing device for the form dressing of the grinding wheel of a crankshaft pin grinding machine.

In the automotive and related industries, diamond dressing tools are used for dressing the grinding wheel to the desired form for accurately grinding crankshaft pins. Some of the equipment used for this purpose is automatic to the extent that the necessary form is imparted to the working face of the grinding wheel by means of diamond dressing tools operating through a cam-controlled dressing sequence under full electrical control. There are, however, a large number of crankshaft pin grinding machines that require the machine operator to grind the crankshaft pin diameters and adjacent radii without such automatic operation as is embodied in the more modern machines.

This invention has for an object to provide a crankshaft-simulating dresser to assist operators of non-automatic crankshaft pin grinding machines in the form dressing of the grinding wheel and to provide a higher degree of controlled accuracy not normally possible without the more expensive automatic dressing equipment.

It is a further important object of this invention to provide a dressing device that simulates the related crankshaft in physical dimensions and that may, therefore, be positioned in the same manner as the crankshaft would be positioned in a crankshaft pin grinding machine, pin offset fixture, whereby a diamond-set form dressing wheel mounted on said dressing device assumes the same relative position as a crankshaft pin would when located for grinding.

It is a further important object of this invention to provide a crankshaft-simulating dresser for association with non-automatic crankshaft pin grinding machines so that the dressing of the grinding wheel of such machine can be performed quickly, reliably and consistently accurately.

Other and further important objects of this invention will become apparent from the following description and from the accompanying drawing, in which like reference numerals refer to like parts, and wherein:

FIGURE 1 is a top plan view, more or less diagrammatic with parts broken away, illustrating the manner of mounting a crankshaft-simulating dresser of my invention in a crankshaft pin grinding machine pin offset fixture (or "pot-chuck," as this fixture is known in the trade);

FIGURE 2 is an enlarged fragmentary view, otherwise similar to that of FIGURE 1, illustrating a modified form of diamond-set form dressing wheel; and FIGURE 3 is a fragmentary, side-wise, or end elevational view of the assembly shown in FIGURE 1.

As shown on the drawings:

The reference numeral 10 indicates generally a crankshaft-simulator dresser embodying the principles of my invention. Said dresser 10 is so arranged and constructed as to be capable of being mounted, in place of a crankshaft, in a crankshaft pin grinding machine pin offset fixture 19, 19. Such mounting is shown in a fragmentary and more or less schematic manner in FIGURE 1, wherein the pin offset fixture for supporting and rotating the crankshaft includes a driving head clamp 11 and a driving head center 12, and the other end support comprises a tail stock clamp 13 and a tail stock center 14. Said crankshaft-simulating dresser 10 includes an offset dresser bar, or body portion 15, having axially extending and aligned end portions 16 and 17 mounted in the driving head clamp 11 and in the tail stock clamp 13 with their extremities abutting against the driving head center 12 and the tail stock center 14, respectively.

Said driving head clamp and tail stock clamp portions comprise parts of a typical crankshaft pin bearing grinder pin offset fixture such as used in the grinding of an automotive-type of crankshaft. A grinding wheel, indicated at 18, forms a part of such typical crankshaft grinding machine and, as is customary, the grinding wheel 18 is mounted about a horizontal axis and is reciprocable so that it can be fed toward and away from a crankshaft pin for grinding such pin. As here shown by the arrow 50 (FIG. 1), such reciprocable movement, or feed of the grinding wheel 18 is in a horizontal plane that includes the axis of said grinding wheel 18. Also, as is customary, the grinding wheel 18 is adapted to be driven, as indicated by the arrow 20 (FIG. 3) at an appropriate surface speed, such as 6000 surface feet per minute.

Said offset dresser bar 15 has mounted thereon a spindle holder 21 in the form of an upright U, the upright portions 22 and 23 of which provide bearings for a driven spindle 24. A pair of form dressing wheels 25 and 26 are mounted on said spindle 24 in abutting relationship. As shown in FIG. 1, the dressing wheels 25 and 26 have diamond-set abrasive surfaces 27 and 28 of proper radius of curvature for grinding corner radii on the corresponding corners 29 and 30 of the grinding wheel 18. The axis of the spindle 24, indicated by the dot and dash line A—A, is in the same horizontal plane as the axis (not shown) of the grinding wheel 18. Said axis A—A is offset from the centerline C—L of the axis of the extended ends 16 and 17 of the dresser 10 by the same amount as the axis of a crankshaft pin would be offset from said centerline C—L if a crankshaft were mounted in position for grinding in the pin offset fixture in place of the crankshaft-simulating dresser 10.

An air motor 31 is carried by said offset dresser bar 15 through the medium of said U-shaped spindle holder 21. While any suitable motor could be used in place of the air motor 31, an air motor has been found to be particularly suited for the purpose, both because of its small size and low weight per horsepower and its high starting torque and because of its relatively lower cost than an electric motor. A ½ H.P. air motor capable of 2000 r.p.m, using air at 90 p.s.i., directly connected through a control valve (not shown) to the common spindle 24 is very satisfactory for driving the spindle for the form dressing of a grinding wheel. During such form dressing operation, the grinding machine pin offset fixture is not operated. Only the spindle 24 is driven, as by the air motor 31, together with the form dressing wheels 25, 26. During the dressing operation, the grinding wheel 18 is fed into contact with said form dressing wheels 25, 26 in a conventional manner for the form dressing of the grinding wheel and the form dressing is effected while driving the wheels 25, 26 at a differential surface speed relative to the surface speed of the driven grinding wheel 18.

Thus, the dressing operation is carried out with the crankshaft-simulating dresser 10 mounted in the same manner and position as a crankshaft would be mounted in the pin offset fixture for the grinding of crankshaft pins. In the dressing operation, as just stated, however, the dresser 10 is not rotated by the pin offset fixture; only the form dressing wheel spindle 24 is rotated about its own axis A—A. Such rotation is effected independently by the air motor 31, or other source of power, to effect a surface speed differential between the form dressing wheels 25, 26 and the grinding wheel 18. Rotation of the dressing wheels 25, 26 and grinding wheel 18 may be in the opposite surface directions at the point of contact, as illustrated by arrows 20 and 51 in FIG. 3, or may be in the same surface direction, but, in any event, a positive drive for the dressing wheels 25, 26 is necessary. As indicated in FIG. 3, the dresser 10 and the mounting therefor form a part of an assembly that includes a table 35 on which the grinding machine pin offset fixture, including the driving head clamp 11 and the tail stock clamp 13, are mounted in a conventional crankshaft pin grinding manner.

In the modification illustrated in FIG. 2, a single diamond-set form dressing wheel 36 is substituted for the form dressing wheels 25, 26 in the same manner as illustrated in FIG. 1. Said dressing wheel 36 has an abrasive, diamond-set abrading surface 52 so contoured that the wheel can be used for grinding both the peripheral face 32 of the grinding wheel and also the corner radii 29 and 30 in the same dressing operation. Other forms of diamond dressing wheels may, of course, be used in much the same manner as described herein. Also, different shapes of crankshaft-simulating dressers may be employed where they are to be used for the dressing of grinding wheels employed for the grinding of pins on correspondingly differently shaped crankshafts. Importantly, the diamond-set form dressing wheel is mounted on an offset dresser bar, such as that illustrated, in the same relative position as the pin that is to be ground would be located in the pin offset fixture. This means that the amount of offset between the axis A—A of the spindle 24 from the centerline C—L is equal to the radius of the throw of the particular crankshaft pin that it is desired to grind. This is illustrated in FIG. 3 by the arrowheaded line T—R.

It will be understood that modifications and variations may be effected without departing from the scope of the novel concepts of the present invention.

I claim as my invention:

1. In a crankshaft pin grinding assembly including a pin offset fixture driving head clamp and a tail stock clamp for mounting the crankshaft and a driven grinding wheel mounted for linear feed of said wheel toward and away from a pin on said crankshaft for grinding said pin, an offset dresser bar mounted in place of a crankshaft in said pin offset fixture, means on said dresser bar for mounting a form dressing wheel with its axis in a plane including the axis of said grinding wheel, and means for revolving said form dressing wheel about its axis without driving said pin offset fixture.

2. The assembly defined by claim 1 in which said axes both lie in a horizontal plane.

3. The assembly defined by claim 1 in which said revolving means is an air motor carried by said dresser bar.

4. The assembly defined by claim 3 in which said air motor in operation revolves said diamond-set form dressing wheel at a differential surface speed with respect to said grinding wheel.

5. In an assembly for grinding the pins of a crankshaft, including a driven grinding wheel mounted about a horizontal axis with its axis reciprocable in a horizontal plane into and out of grinding contact with a crankshaft pin, a crankshaft pin grinding machine pin offset fixture, including driving head and tail stock clamps for mounting a crankshaft when grinding a pin thereof, an offset dresser bar in the same position as a crankshaft would be mounted in the driving head and tail stock clamps, means on said dresser bar for rotatably mounting a diamond form dressing wheel with its axis in said horizontal plane including said grinding wheel axis, and a motor carried by said dresser bar for revolving said dressing wheel at a controlled differential surface speed relative to the surface speed of said grinding wheel when said grinding wheel is in contact therewith without driving said pin offset fixture.

6. An offset dresser bar for simulating a crankshaft, said dresser bar comprising an offset intermediate portion and axially extending aligned ends for mounting said dresser bar in a crankshaft pin offset fixture, means on said dresser bar offset intermediate portion for mounting a diamond-set form dressing wheel with its axis in the same position as would be assumed by the axis of a crankshaft pin to be ground, and a motor carried by said dresser bar for rotating a dressing wheel when mounted on said mounting means without driving said pin offset fixture.

7. An offset dresser bar for association with a crankshaft pin grinding assembly including a pin offset fixture, to effect the form dressing of a grinding wheel, said dresser bar simulating a crankshaft and having an intermediate offset portion and axially aligned ends for mounting in said pin offset fixture in the same position as the ends of a crankshaft would be mounted for the grinding of a pin of said crankshaft, means on said dresser bar intermediate offset portion for mounting a diamond-set form dressing wheel in the same relative position as a crankshaft pin would be located when being ground, and an air motor carried by said dresser bar for rotating the said form dressing wheel when so mounted without driving said pin offset fixture.

References Cited by the Examiner
UNITED STATES PATENTS 1,724,050   8/1929   Stratton _____ 51—99

ROBERT C. RIORDON, *Primary Examiner.*